# 2,834,354

FILTERING MATERIAL FOR TOBACCO SMOKE

Elias Rosenberg, Paris, France

No Drawing. Application March 23, 1956
Serial No. 573,558

Claims priority, application France March 25, 1955

5 Claims. (Cl. 131—208)

It is well known that recent works appear to show that the cancer-producing products, or at any rate the most irritating agents of tobacco smoke, are constituted in part at least by hydrocarbons with high molecular weights, such as e. g. benzo-3-4-pyrene, which are present with tars, in the tobacco smoke.

It is therefore important to retain the largest possible part of the tars with the heavy hydrocarbons with which they are associated, while allowing the light hydrocarbons which contribute to the aroma of the smoke to get through.

According to the present invention, the filtering material intended to separate the products entering into the composition of a complex known as "tobacco smoke," i. e., to keep back, at least in part, the tars together with the heavy hydrocarbons e. g. benzo-3-4-pyrene and the like carcinogenic hydrocarbons and to allow the light hydrocarbons to pass freely, is characterized by the fact that it comprises a support which is permeable to gases and impregnated with slightly polymerized furfural.

In its preferred embodiment, the new filtering material, which can be used for making cigarette filters (that is to say, can form a part of the cigarette tip), pipe-filters, cigarette-holder filters, or cigar-holder filters, is further characterized in that the permeable support is made of fibrous material such as cotton, paper, or similar products, or preferably of silica gel granules.

The filtering material can be contained in a cartridge or container pierced at both ends so as to allow the smoke to pass through.

In order to obtain the new filtering material, use is made of furfural which is applied on the support, and then slightly polymerized in situ in an alkaline medium.

To this end, the support is impregnated with a mixture of furfural and a strong base.

A process for obtaining the filtering materal is set forth below.

Five cc. of caustic soda solution, (made by dissolving 500 grains of sodium hydroxide in 1000 cc. of water), is added to the furfural solution made by dissolving 200 cc. of furfural in 1000 cc. of water.

Caustic potash can be substituted for the caustic soda and substantially the same results achieved. The purpose of the soda (or potash) is to create an alkaline medium which brings about a slight polymerization of the furfural molecules.

The support (cotton or similar supporting material mentioned above), preferably in thin layers, is impregnated with the above mixture and placed in a dryer at 60° C. until it is completely dried. It is then washed (generally three times) in an appropriate solvent, as described below until the yellow color disappears, and then in water.

The purpose of this washing is to eliminate the residue of furfural which has not been polymerized.

After it has been dried, the support impregnated with polymerized furfural is placed in the filter tips, filtering cartridges, and the like.

In an advantageous alternative embodiment in which the support is silica gel, the latter is impregnated with a solution of potash and furfural in variable proportions according to the desired impregnation.

In a preferred method of preparation comprising the use of silica gel forming the support of the filtering material, it is possible to work as follows:

A potash solution formed of one part of caustic potash and one part of distilled water is prepared.

15 parts of this solution are mixed with one part of furfural and there are dipped in this mixture, at room temperature, baskets made of fine wire netting containing the silica gel.

After a dip of about 5 minutes, the baskets are withdrawn from the mixture and the impregnated silica gel is allowed to drain during about 5 minutes.

The impregnated silica gel is thus spread out on trays which are placed in a dryer heated at about 60° C. and through which passes a light air stream. It will be noted that the air is absolutely necessary for the polymerisation of the furfural. The drying may be performed for a period of from 6 to 12 hours.

When the silica gel impregnated with the slightly polymerized furfural, comes from the dryer, a certain amount of furfural is not polymerised.

It is necessary to eliminate, from the filtering material, the irritating unpolymerized residue of furfural. This result is obtained by repeated washings in appropriate solvents, mentioned below.

These washings (generally three) of the impregnated silica gel, are performed, at normal temperature, for example with an organic solvent, such as a mixture (1:1) of ethyl alcohol and ether, or methyl alcohol and ether, or dioxane and ether.

After the washings in the solvent, the material may be washed with water.

The silica gel now impregnated with the slightly polymerized furfural and always on the trays is then heated in a gentle air stream, at a moderate temperature ( about 40° C. for example).

The final material consists of a support carrying only slightly polymerized furfural. The impregnated silica gel is light yellow in colour.

It is obvious that the embodiments of the invention set forth in the specification and embodied in the claims have been given merely by way of illustration and are not restrictive and that any detail change can be made therein without departing from the spirit of the invention.

What I claim is:

1. Filtering material of the class used to filter tobacco smoke, comprising a support permeable to gases, and slightly polymerized furfural fixed on said support so that the said material can retain tars and heavy hydrocarbons carried by the tobacco smoke, but permit the passage of light hydrocarbons which constitute a substantial part of the aroma of tobacco smoke.

2. Filtering material according to claim 1, in which the support is a fibrous product.

3. Filtering material according to claim 1, in which the support is silica gel.

4. A tobacco smoke filter, comprising a container having smoke passages therein so as to allow the smoke to pass through said container, filtering means disposed in said container, said filtering means comprising carrier material having slightly polymerized furfural supported thereon, said carrier material being constructed and arranged so as to permit tobacco smoke to pass therethrough.

5. A method of removing heavy hydrocarbons from tobacco smoke which comprises the steps of providing a smoke permeable medium containing partially polymerized furfural, passing tobacco smoke into intimate contact with said partially polymerized furfural to bring about the retention of at least a substantial proportion of the heavy hydrocarbons present in the smoke while allowing the passage of the lighter and aroma providing hydrocarbons of the tobacco smoke.

References Cited in the file of this patent

UNITED STATES PATENTS

| | | |
|---|---|---|
| 2,354,876 | Owens | Aug. 1, 1944 |
| 2,379,502 | Swift | July 3, 1945 |
| 2,763,267 | Müller | Sept. 18, 1956 |
| 2,780,228 | Touey | Feb. 5, 1957 |

FOREIGN PATENTS

| | | |
|---|---|---|
| 121,414 | Australia | Mar. 30, 1944 |